(12) United States Patent
Yang (10) Patent No.: US 11,632,329 B2
(45) Date of Patent: Apr. 18, 2023

(54) RESOURCE MANAGEMENT SYSTEM AND RESOURCE MANAGEMENT METHOD

(71) Applicant: WISTRON NEWEB CORPORATION, Hsinchu (TW)

(72) Inventor: Jen-Shun Yang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 77 days.

(21) Appl. No.: 17/395,607

(22) Filed: Aug. 6, 2021

(65) Prior Publication Data

US 2022/0141140 A1 May 5, 2022

(30) Foreign Application Priority Data

Nov. 3, 2020 (TW) ................................. 109138239

(51) Int. Cl.
| | |
|---|---|
| H04L 47/125 | (2022.01) |
| H04L 47/762 | (2022.01) |
| G06N 3/04 | (2023.01) |
| H04L 47/70 | (2022.01) |
| H04L 47/78 | (2022.01) |

(52) U.S. Cl.
CPC ............ *H04L 47/125* (2013.01); *G06N 3/04* (2013.01); *H04L 47/762* (2013.01); *H04L 47/781* (2013.01); *H04L 47/822* (2013.01)

(58) Field of Classification Search
CPC ................. H04L 47/125; H04L 47/762; H04L 47/781; H04L 47/822; G06N 3/04
See application file for complete search history.

(56) References Cited

U.S. PATENT DOCUMENTS

| | | | | |
|---|---|---|---|---|
| 10,540,608 | B1 * | 1/2020 | Dirac | G06N 20/00 |
| 11,150,931 | B2 * | 10/2021 | Sharma | G06F 9/505 |
| 2021/0201437 | A1 * | 7/2021 | Yerli | G06T 1/20 |
| 2022/0187847 | A1 * | 6/2022 | Cella | G06Q 50/28 |

\* cited by examiner

*Primary Examiner* — Kibrom T Hailu
(74) *Attorney, Agent, or Firm* — McClure, Qualey & Rodack, LLP (57) ABSTRACT

A resource management system and a resource management method are provided. The resource management method is applicable to a plurality of worker nodes and master nodes that are communicatively connected with one another, and the worker nodes and the master node each include a resource pool, a resource monitor, a collector agent module, a traffic steering inference module, and a request processing module. The master node further includes a data collector, an artificial intelligence computing module, and a load balancer. The resource management method includes performing internal resource management processes and external resource management processes for the worker nodes and the master node, to mix and apply a centralized resource management mechanism and a distributed resource management mechanism.

16 Claims, 6 Drawing Sheets

RESOURCE MANAGEMENT SYSTEM AND RESOURCE MANAGEMENT METHOD

CROSS-REFERENCE TO RELATED PATENT APPLICATION

This application claims the benefit of priority to Taiwan Patent Application No. 109138239, filed on Nov. 3, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a resource management system and a resource management method, and more particularly to a resource management system and a resource management method capable of mixing and applying centralized and distributed resource management mechanisms.

BACKGROUND OF THE DISCLOSURE

Due to rise of the 5G private network, hybrid cloud computing has become one of the most important topics in the related art. Edge computing devices in computing devices are often built in an application field in a decentralized manner, while utilizing network to connect to a private cloud or a public cloud. In order to effectively balance the use of computing or network resources, a "cluster" manner is commonly used, in which a master node (MN) is selected to manage assignment of work demands from worker nodes (WNs).

However, delays in network transmission and data compression cause inability to meet service quality requirements of terminal users, resulting in waste of resources and power consumption. Although many distributed resource management mechanisms have been proposed, the following problems still exist:

1. The existing distributed resource management mechanism and a centralized cluster resource management mechanism cannot coexist.

2. In the existing distributed resource management mechanism, in order to achieve load balancing and rapid assignment, a resource status of each working node needs to be shared, causing additional network traffic and decision-making delay, and a convergence time for load balancing becomes longer due to shifts of hot spots, causing a pendulum effect.

3. The existing distributed resource management mechanism utilizes reserved "sharable"/"non-sharable" resource policy in part for distributed management, which is rigid and lacks a flexible reservation mechanism, causing waste and lower efficiency in the use of resources.

4. In existing mesh edge cloud using wireless relay connection, neither the utilization of purely centralized or purely distributed resource management is conducive to the quality and efficiency of the use of resources.

Therefore, improving a resource management mechanism has become one of the important issues in the art.

SUMMARY OF THE DISCLOSURE

In response to the above-referenced technical inadequacies, the present disclosure provides a resource management system and a resource management method capable of mixing and applying centralized and distributed resource management mechanisms.

In one aspect, the present disclosure provides a resource management system, which includes a plurality of worker nodes and a master node that are connected to each other in communication. Each of the plurality of worker nodes and the master node includes a resource pool, a resource monitor, a collector agent module, a traffic steering inference module, a request processing module, an admission controller, and a threshold adjuster; and the master node further includes a data collector, an artificial intelligence (AI) computing module, and a load balancer. The resource pool is configured to divide a corresponding system resource into a sharable resource and a non-sharable resource. The resource monitor is configured to record usage status of the resource pool and generate resource usage monitoring data. The collector agent module is configured to transmit the generated resource usage monitoring data. The traffic steering inference module is configured to receive the resource usage monitoring data, and calculate weight ratios of the non-sharable resource and the sharable resource based on the resource usage monitoring data to generate an admission control policy. The request processing module is configured to receive a plurality of resource usage requests from a plurality of electronic devices. The admission controller is configured to allocate the plurality of resource usage requests to the non-sharable resource and the sharable resource according to the admission control policy. The threshold adjuster is configured to adjust an allocation ratio of the sharable resource and the non-sharable resource. The data collector is configured to receive the resource usage monitoring data of the plurality of worker nodes and the master node from the collector agent modules of the plurality of worker nodes and the master node, to generate resource usage statistics data. The AI computing module is configured to input the resource usage statistics data into a trained AI model to generate a plurality of records of threshold data for allocating the resource pools of the plurality of worker nodes and the master node, respectively. Each of the plurality of records of threshold data defines the allocation ratio in each of the resource pools, and the traffic steering inference modules of the plurality of worker nodes and the master node are configured to respectively control, based on the plurality of records of threshold data, the corresponding threshold adjusters to adjust the sharable resources and the non-sharable resources of the resource pools. The load balancer is configured to balance the plurality of resource usage requests that are allocated to the sharable resource in each of the plurality of worker nodes and the master node to all of the sharable resources of the plurality of worker nodes and the master node.

In another aspect, the present disclosure provides a resource management method applicable to a plurality of worker nodes and a master node in communication with each other, each of the plurality of worker nodes and the master node includes a resource pool, a resource monitor, a collector agent module, a traffic steering inference module, a request processing module, an admission controller, and a threshold adjuster, and the master node further includes a data collector, an artificial intelligence (AI) computing module, and a load balancer, and the resource management method includes: performing an internal resource management process for each of the plurality of worker nodes and the master node, in which the internal resource management process includes: configuring the resource pool to divide a corresponding system resource into a sharable resource and a non-sharable resource; configuring the resource monitor to record usage status of the resource pool and generate resource usage monitoring data; configuring the collector agent module to transmit the generated resource usage monitoring data to the traffic steering inference module; configuring the traffic steering inference module to receive the resource usage monitoring data, and calculate weight ratios of the non-sharable resource and the sharable resource based on the resource usage monitoring data to generate an admission control policy; configuring the request processing module to receive a plurality of resource usage requests from a plurality of electronic devices; and configuring the admission controller to allocate the plurality of resource usage requests to the non-sharable resource and the sharable resource according to the admission control policy. The threshold adjuster is configured to adjust an allocation ratio of the sharable resource and the non-sharable resource. The resource management method further includes performing an external resource management process for each of the plurality of worker nodes and the master node, and the external resource management process includes: configuring the data collector to receive the resource usage monitoring data of the plurality of worker nodes and the master node from the collector agent modules of the plurality of worker nodes and the master node, to generate resource usage statistics data; configuring the AI computing module to input the resource usage statistics data into a trained AI model to generate a plurality of records of optimized threshold data for allocating the resource pools of the plurality of worker nodes and the master node, respectively, in which each of the plurality of records of optimized threshold data defines the allocation ratio in each of the resource pools; configuring the traffic steering inference modules of the plurality of worker nodes and the master node to respectively control, based on the plurality of records of optimized threshold data, the corresponding threshold adjusters to adjust the sharable resources and the non-sharable resources of the resource pools; and configuring the load balancer to balance the plurality of resource usage requests that are allocated to the sharable resource in each of the plurality of worker nodes and the master node to all of the sharable resources of the plurality of worker nodes and the master node.

Therefore, the resource management system and the resource management method provided by the present disclosure have an innovative distributed resource management architecture that can mix and apply centralized and distributed resource management mechanisms. The internal resource management process realizes a fast and low-latency distributed resource management architecture and a pipelined synchronization execution mechanism. Based on the resource pool architecture, adjustable and dynamic ratio of the sharable and the non-sharable resources can be achieved.

In addition, the resource management system and the resource management method provided by the present disclosure form a sharable resource pool architecture by integrating the sharable resources of the plurality of worker nodes, and the sharable resource pool architecture is compatible with the existing centralized resource management mechanism. On the other hand, the external resource management process uses AI to analyze big data to further realize a dynamic adjustment mechanism of resource thresholds, so as to adjust allocation ratios of the sharable resources and the non-sharable resources.

For efficiency and resource usage, the resource management system and the resource management method provided by the present disclosure have a distributed internal resource management process and a pipeline synchronous execution mechanism, such that local requests can immediately use local resources, which further avoid delays that may occur in a non-network transmission environment and a centralized decision-making mechanism.

Furthermore, the dynamic adjustment mechanism of the resource threshold achieved by using AI to analyze big data can achieve load balance and resource usage optimization for the worker nodes with heavy loading, through virtual application (vApp) migration of program execution position and increasing a proportion of the non-sharable resources.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
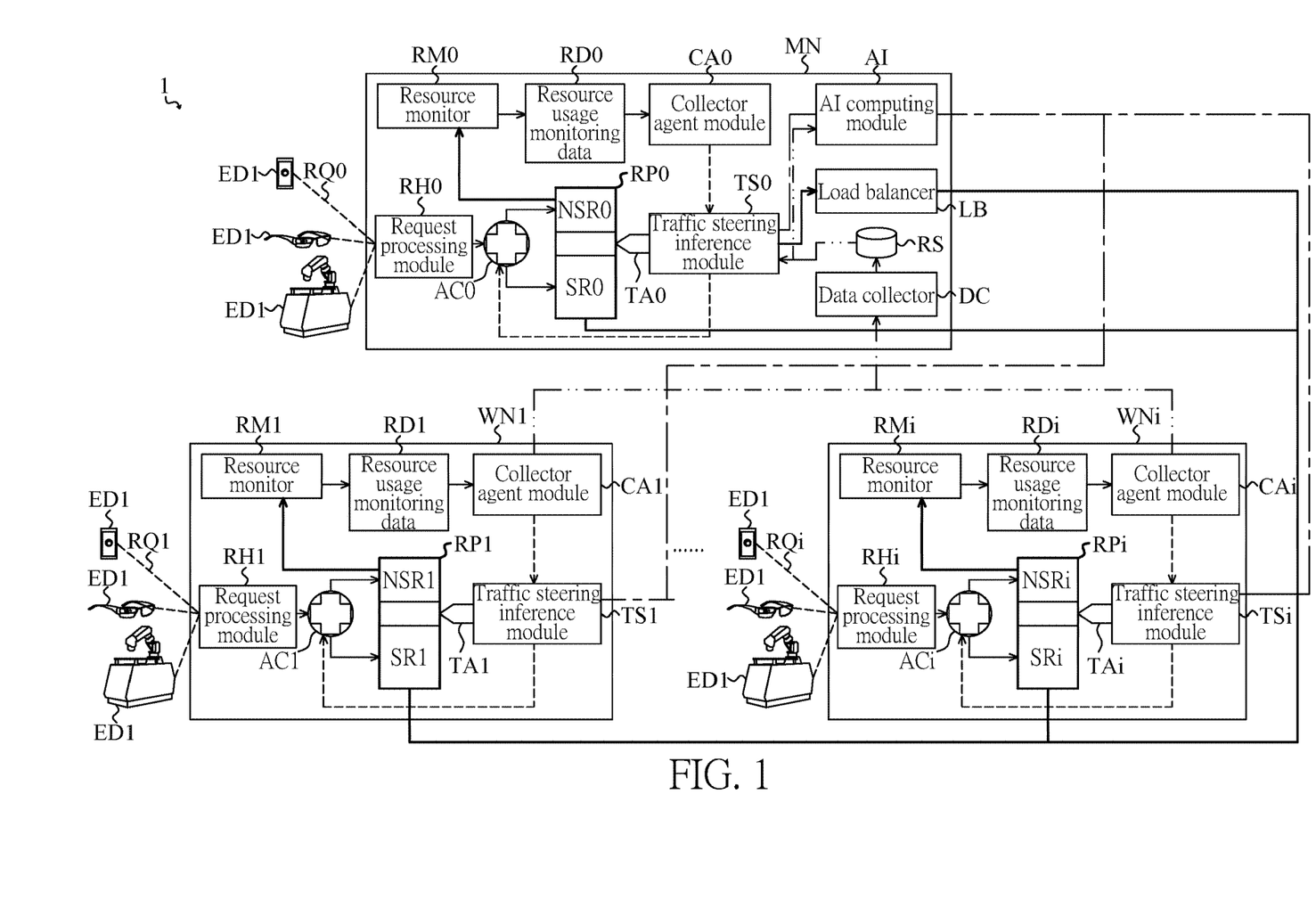
FIG. 1 is a block diagram of a resource management system according to an embodiment of the present disclosure.

FIG. 1 is a block diagram of a resource management system according to an embodiment of the present disclosure. Referring to FIG. 1, an embodiment of the present disclosure provides a resource management system 1 that includes a plurality of worker nodes WN1, . . . , WNi and a master node MN connected to one another in communication.

The worker node WN1 includes a resource pool RP1, a resource monitor RM1, a collector agent module CAL a traffic steering inference module TS1, a request processing module RH1, an admission controller AC1, and a threshold adjuster TA1. The rest of the worker nodes and the master node MN basically have the same configuration as the worker node WN1. For example, the worker node WNi includes a resource pool RPi, a resource monitor RMi, a collector agent module CAi, a traffic steering inference module TSi, a request processing module RHi, an admission controller ACi, and a threshold adjuster TAi, and the master node MN includes a resource pool RP0, a resource monitor RM0, a collector agent module CA0, a traffic steering inference module TS0, a request processing module RH0, an admission controller AC0, and a threshold adjuster TA0. Unless it is necessary, repeated description are omitted hereinafter.

It should be noted that the resource pool, the resource monitor, the collector agent module, the traffic steering inference module, the request processing module, the admission controller, and the threshold adjuster used in the above-mentioned worker nodes WN1 through WNi and the master node MN can be realized in a form of hardware, software or firmware. When the above-mentioned components or modules are implemented in the form of software, program codes used to execute functions of the above-mentioned components or modules can be stored in a built-in memory of a general computer system and executed by a processor to realize the above-mentioned components or modules.

The resource pool RP1 divides the system resource corresponding to the worker node WN1 into a sharable resource SR1 and a non-sharable resource NSR1. Taking the worker node WN1 being a common computer system as an example, the worker node WN1 can include a central processing unit (CPU), a memory, a flash memory, a network transmission interface, a hard disk, and a graphic processor. Therefore, the aforementioned system resources can include processing capacity of a CPU, memory usable capacity, network usable capacity, flash memory usable capacity, hard disk usable capacity, and processing capacity of the graphic processor, but the present disclosure is not limited thereto. The present disclosure mainly forms a sharable resource pool architecture by integrating the sharable resources SR1, . . . , SRi of every worker node WN1, . . . , WNi, which is compatible with the existing centralized resource management mechanism.

The request processing module RH1 receives a plurality of resource usage requests RQ1 from a plurality of electronic devices ED1. The worker node WN1 can be connected to the plurality of electronic devices ED1, and these electronic devices ED1 are local devices relative to the worker node WN1. In some embodiments, the non-sharable resource NSR1 is only used to serve the local devices, that is, only used to respond to a request RQ1 from the local device, and the sharable resource SR1 can be used to serve the resource usage requests of the electronic device ED1 of all worker nodes WN1, . . . , WNi and the master node MN.

The resource monitor RM1 is used to record usage status of the resource pool RP1 and generate resource usage monitoring data RD1. For example, the resource monitor RM1 can continuously collect resource usage requests RQ1 of a plurality of electronic devices ED1 (i.e., local devices) for a long time as the resource usage monitoring data RD1.

The collector agent module CA1 is configured to transmit the generated resource usage monitoring data RD1, and the traffic steering inference module TS1 receives the resource usage monitoring data RD1, and calculates a weight ratio WNSR1 of the non-sharable resource NSR1 and a weight ratio WSR1 of the sharable resource SR1 based on the resource usage monitoring data RD1 to generate an admission control policy. As mentioned above, the resource usage monitoring data RD1 is continuously collected through the resource monitor RM1 for a long time, and can include a time point corresponding to a collection of the resource usage request of the local device. Therefore, the traffic steering inference module TS1 can further obtain a current time, and based on the current time and the number of the resource usage requests corresponding to the current time in the resource usage monitoring data RD1, the traffic steering inference module TS1 can further calculate the weight ratio WNSR1 of the non-sharable resource NSR1 and the weight ratio WSR1 of the sharable resource NSR1.

For example, if the current time corresponds to a time period with a large number of the resource usage requests from the local device, the traffic steering inference module TS1 tends to reserve more non-sharable resources NR1. Therefore, the weight ratio WNSR1 of the non-sharable resource NSR1 will be greater than the weight ratio WSR1 of the sharable resource SR1. However, it should be noted that a summation of the weight ratio WNSR1 of the non-sharable resource NSR1 and the weight ratio WSR1 of the sharable resource SR1 is 1. The admission control policy is used to enable the admission controller AC1 to accordingly determine how to allocate these resource usage requests RQ1 to the non-sharable resource NSR1 and the sharable resource SR1. In some embodiments, the traffic steering inference module TS1 calculates loads of the non-sharable resource NSR1 and the sharable resource SR1 according to the resource usage monitoring data RD1 to generate the admission control policy. For example, the admission control policy can include the following items:

1. If the load of the non-sharable resource NSR1 is less than a heavy loading threshold, the plurality of resource usage requests RQ1 are allocated to the non-sharable resource NSR1.

2. If the load of the non-sharable resource NSR1 is greater than or equal to the heavy loading threshold, and a random value related to the plurality of resource usage requests RQ1 is less than or equal to the weight ratio WNSR1 of the non-sharable resource NSR1, then the plurality of resource usage requests RQ1 are allocated to the non-sharable resource NSR1. In other words, when the load status is of heavy loading, the resource usage request RQ1 currently to be determined is associated with a random value between 0 and 1, and the random value is compared with the weight ratio WNSR1 of the non-sharable resource NSR1.

3. If the load of the non-sharable resource NSR1 is greater than or equal to the heavy loading threshold and the random value related to the resource usage requests RQ1 is greater than the weight ratio WNSR1 of the non-sharable resource NSR1, the plurality of resource usage requests RQ1 are allocated to the sharable resource SR1.

4. If the number of the plurality of resource usage requests RQ1 is greater than a current available resource amount of the resource pool RP1, then these resource usage requests are rejected.

Therefore, the admission controller AC1 allocates the plurality of resource usage requests RQ1 to the non-sharable resource NSR1 and the sharable resource SR1 according to the above-mentioned admission control policy. It should be noted that the threshold adjuster TA1 shown in FIG. 1 is used to adjust the allocation ratio of the sharable resource SR1 and the non-sharable resource NSR1. However, in an internal resource management process described below, the threshold adjuster TA1 is not used.

Figure 2:
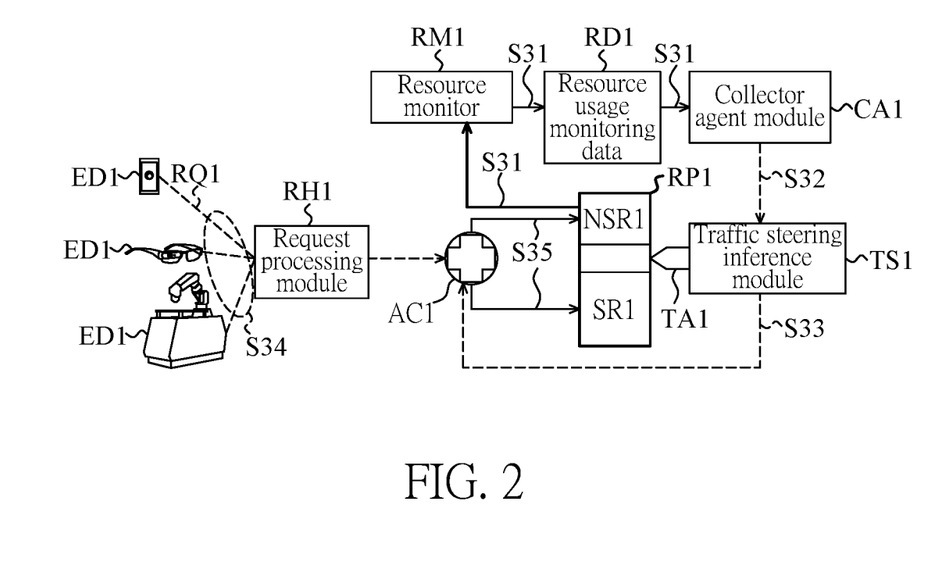
FIG. 2 is a schematic diagram of an internal resource management process according to an embodiment of the present disclosure.
Figure 3:
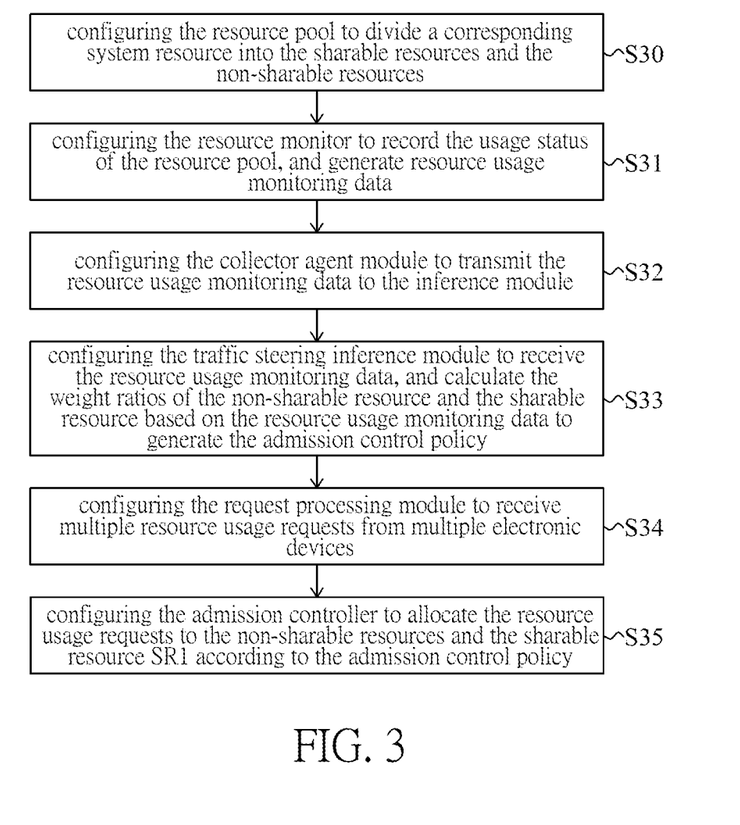
FIG. 3 is a flowchart of the internal resource management process according to the present disclosure.

Reference is made to FIGS. 2 and 3. FIG. 2 is a schematic diagram of the internal resource management process according to an embodiment of the present disclosure, and FIG. 3 is a flowchart of the internal resource management process according to the present disclosure. As shown in FIGS. 2 and 3, in this configuration, the internal resource management process can be performed on modules such as the resource pool RP1, the resource monitor RM1, the collector agent module CA1, the traffic steering inference module TS1, the request processing module RH1, the admission controller AC1 and the threshold adjuster TA1 of the worker node WN1, thereby reorganizing mechanisms of resource management and load balancing in a pipelined manner. The internal resource management process includes:

Step S30: configuring the resource pool RP1 to divide a corresponding system resource into the sharable resource SR1 and the non-sharable resource NSR1.

Step S31: configuring the resource monitor RM1 to record the usage status of the resource pool RP1, and generate resource usage monitoring data RD1.

Step S32: configuring the collector agent module CA1 to transmit the resource usage monitoring data RD1 to the traffic steering inference module TS1.

Step S33: configuring the traffic steering inference module TS1 to receive the resource usage monitoring data RD1, and calculate the weight ratios of the non-sharable resource NSR1 and the sharable resource SR1 based on the resource usage monitoring data RD1 to generate the admission control policy.

Step S34: configuring the request processing module RH1 to receive multiple resource usage requests from multiple electronic devices ED1.

Step S35: configuring the admission controller AC1 to allocate the resource usage requests to the non-sharable resource NSR1 and the sharable resource SR1 according to the admission control policy.

Therefore, the internal resource management process can achieve a fast and low-latency distributed resource management architecture and a pipelined synchronization execution mechanism, such that local requests can immediately use local resources, which further avoid delays that may occur in a non-network transmission environment and centralized decision-making mechanism.

Reference is further made to FIG. 1, and the master node MN of the resource management system 1 of the present disclosure is further described hereinafter. As shown in FIG. 1, the master node MN has the same architecture as the worker nodes WN1, . . . , WNi, and therefore can be used to process local requests relative to the master node MN. In addition, the master node MN also includes a data collector DC, an artificial intelligence computing module AI, and a load balancer LB.

The data collector DC receives resource usage monitoring data RD0, RD1, . . . , RDi from the collector agent modules CA1, . . . , CAi of the worker nodes WN1, . . . , WNi, and the collector agent module CA0 of the master node MN, to generate resource usage statistics data RS.

The artificial intelligence computing module AI is configured to input the resource usage statistics data RS into a trained artificial intelligence model to generate a plurality of records of threshold data for allocating the resource pools RP1, . . . , RPi of the worker nodes WN1, . . . , WNi and the resource pool RP0 of the master node MN, respectively. The trained artificial intelligence model is generated by training an artificial intelligence model AIM with historical resource usage statistics data HIS. In one embodiment of the present disclosure, the artificial intelligence model AIM can be a neural network model.

Figure 4:
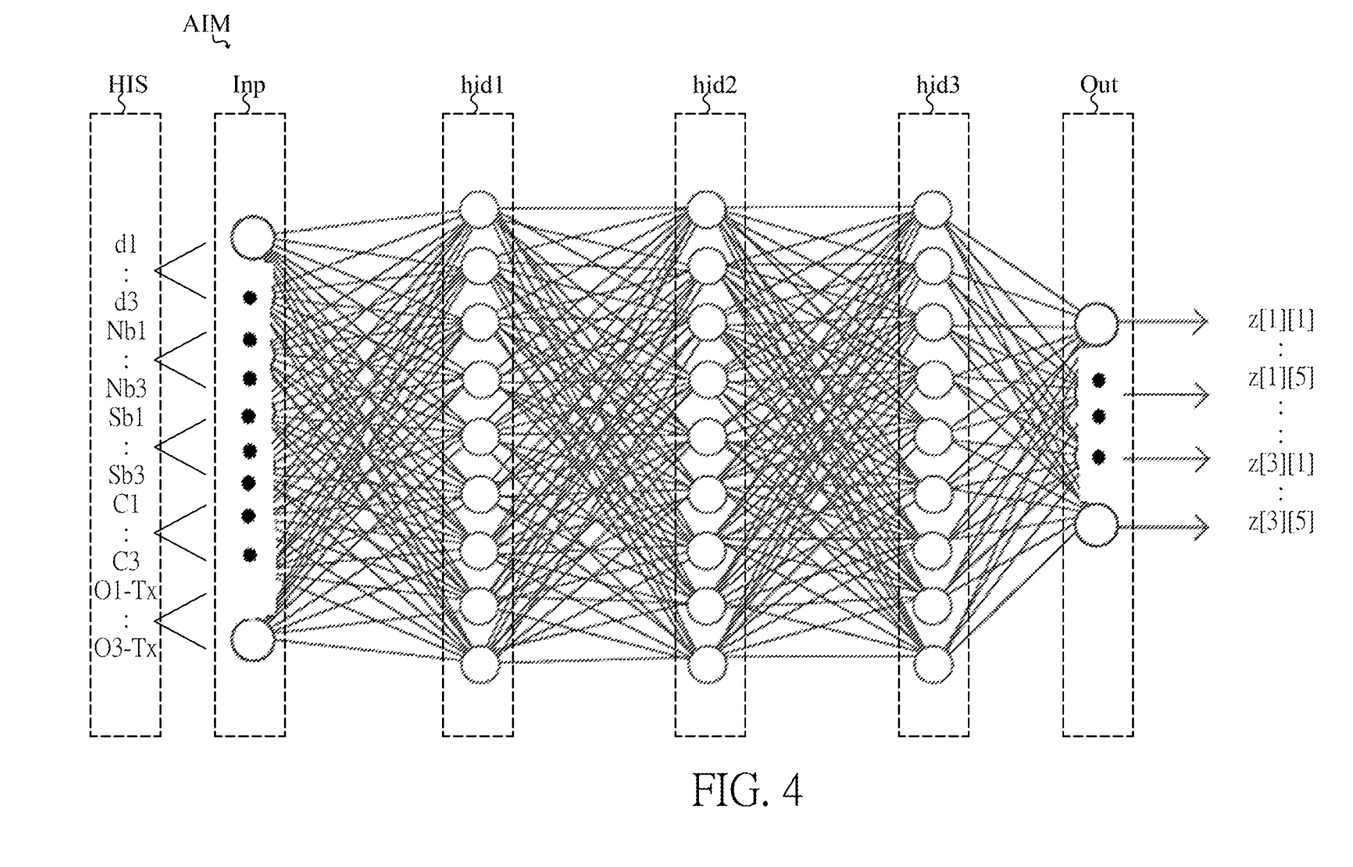
FIG. 4 is a schematic diagram of a neural network model according to an embodiment of the present disclosure.

Reference is made to FIG. 4, which is a schematic diagram of a neural network model according to an embodiment of the present disclosure. As shown in FIG. 4, the neural network model includes an input layer Inp, an output layer Out, and a plurality of hidden layers hid1, hid2 and hid3, and the input layer Inp, the output layer Out, and the hidden layers hid1, hid2 and hid3 each include a plurality of neurons. Taking FIG. 4 as an example, the input layer Inp and the output layer Out each include 15 neurons, and the input historical resource usage statistics data HIS includes user required resources d1 through d3, remaining resources Nb1 through Nb3 of the non-sharable resources, remaining resources Sb1 through Sb3 of the sharable resources, time information C1 through C3, and resource usage status O1-Tx through O3-Tx at a specific time Tx.

In other words, 3 records of data, for example, can be extracted from each field of the historical resource usage statistics data HIS as the aforementioned user required resources d1 through d3, the remaining resources Nb1 through Nb3 of the non-sharable resources, the remaining resources Sb1 through Sb3 of the sharable resources, the time information C1 through C3, and the resource usage status O1-Tx through O3-Tx at a specific time Tx, to be used to train the neural network model, and provide the corresponding optimization calculation amount allocation method (e.g., output vectors $z[1][1]$ to $z[1][5]$, . . . , $z[3][1]$, . . . , $z[3][5]$ of FIG. 4) to the neural network model, such that a trained artificial intelligence model can finally be generated.

Then, the resource usage statistics data RS generated by long-term data collection is input into the multi-layer neural network and the selected artificial intelligence/machine learning model as shown in FIG. 4, and the output threshold data can be applied to the resource pools RP0, RP1, . . . , RPi of the master node MN and the worker nodes WN1, . . . , WNi. For example, the threshold adjusters TA0, TA1, . . . , TAi are adjusted according to the different allocation ratios between the non-sharable resource NSR and the sharable resource SR every time a specific period is elapsed. It should be noted that, taking the worker node WN1 as an example, the allocation ratio mentioned above refers to a ratio of the sharable resource SR0 to the non-sharable resource NSR0 obtained after the threshold adjuster TA1 adjusts the resource pool RP1 according to the threshold data output by the artificial intelligence/machine learning model. Further, the allocation ratio is different from the weight ratio mentioned above, the weight ratio WNSR1 of the non-sharable resource NSR1 and the weight ratio WSR1 of the sharable resource SR1 can be used to enable the admission controller AC1 to determine how to respectively allocate the plurality of resource usage requests RQ1 received by the admission controller AC1 to one of the sharable resource SR0 and the non-sharable resource NSR0.

Therefore, the dynamic adjustment mechanism of the resource threshold achieved by using artificial intelligence to analyze big data can achieve load balance and resource usage optimization for the worker nodes with heavy loading, through virtual application (vApp) migration of program execution position and increasing a proportion of the non-sharable resources.

After the allocation ratio of the non-sharable resources and the sharable resources in the resource pools RP0, RP1, ..., RPi are determined based on the threshold value data, the load balancer LB can further balance the resource usage requests RQ0, RQ1, ..., RQi, which are allocated to the sharable resources SR0, SR1, ..., SRi of the master node MN and the worker nodes WN1, ..., WNi in the aforementioned internal resource management process, to the sharable resources SR0, SR1, ..., SRi of the master node MN and the worker node WN1, ..., WNi.

Figure 5:
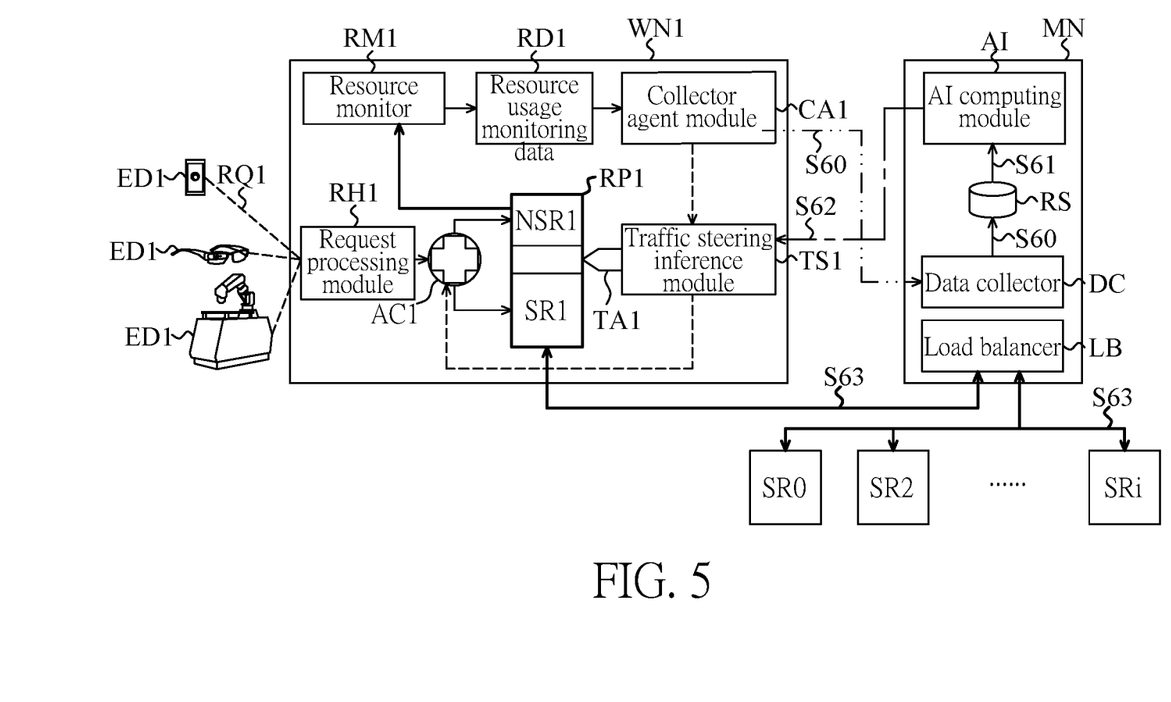
FIG. 5 is a schematic diagram of an external resource management process according to an embodiment of the present disclosure.
Figure 6:
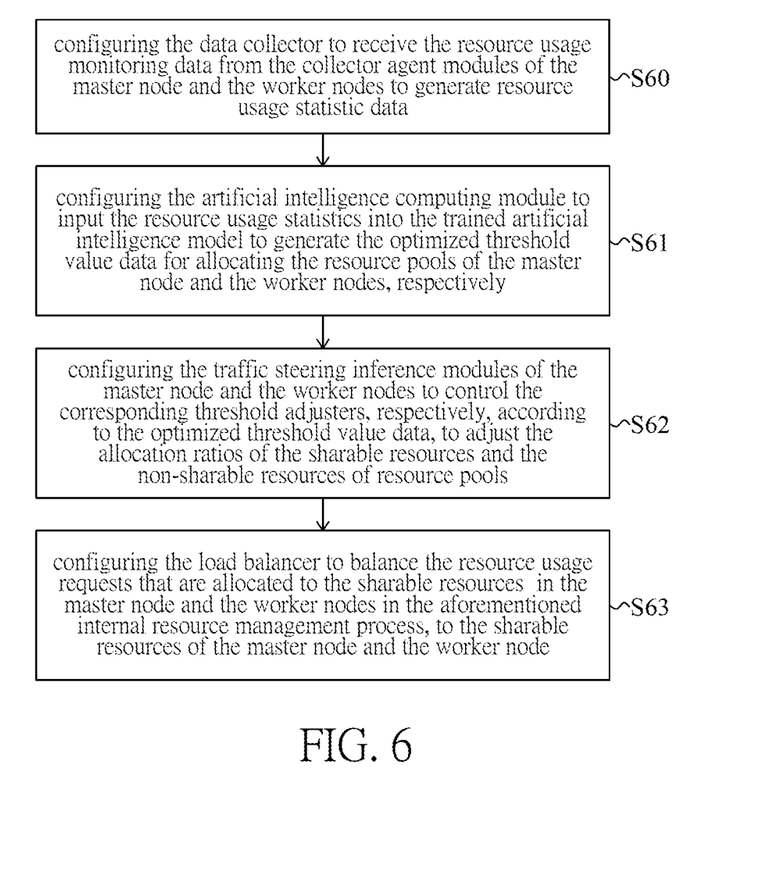
FIG. 6 is a flowchart of the external resource management process according to an embodiment of the present disclosure.

Therefore, under the above-mentioned architecture, an external resource management process can be performed for the master node MN and the worker nodes WN1, ..., WNi. Reference is made to FIGS. 5 and 6. FIG. 5 is a schematic diagram of the external resource management process according to an embodiment of the present disclosure, and FIG. 6 is a flowchart of the external resource management process according to an embodiment of the present disclosure. As shown in FIGS. 5 and 6, the external resource management process includes:

Step S60: configuring the data collector DC to receive the resource usage monitoring data RD0, RD1, ..., RDi from the collector agent modules CA0, CA1, ..., CAi of the master node MN and the worker nodes WN1, ..., WNi, to generate the resource usage statistics data RS.

Step S61: configuring the artificial intelligence computing module AI to input the resource usage statistics data RS into the trained artificial intelligence model to generate the optimized threshold value data for allocating the resource pools RP0, RP1, ..., RPi of the master node MN and the worker nodes WN1, ..., WNi, respectively.

Step S62: configuring the traffic steering inference modules TS0, TS1, ..., TSi of the master node MN and the worker nodes WN1, ..., WNi to control the corresponding threshold adjusters TA0, TA1, ..., TAi, respectively, according to the optimized threshold value data, to adjust the allocation ratios of the sharable resources SR0, SR1, ..., SRi and the non-sharable resources NSR0, NSR1, ..., NSRi of the resource pools RP0, RP1, ..., RPi.

Step S63: configure the load balancer LB to balance the resource usage requests RQ0, RQ1, ..., RQi, which are allocated to the sharable resources SR0, SR1, ..., SRi of the master node MN and the worker nodes WN1, ..., WNi in the aforementioned internal resource management process, to the sharable resources SR0, SR1, ..., SRi of the master node MN and the worker node WN1, WNi.

In conclusion, the resource management system and the resource management method provided by the present disclosure have an innovative distributed resource management architecture that can mix and apply centralized and distributed resource management mechanisms. The internal resource management process realizes a fast and low-latency distributed resource management architecture and a pipelined synchronization execution mechanism. Based on the resource pool architecture, adjustable and dynamic ratio of the sharable and the non-sharable resources can be achieved.

In addition, the resource management system and the resource management method provided by the present disclosure form a sharable resource pool architecture by integrating the sharable resources of the plurality of worker nodes, and the sharable resource pool architecture is compatible with the existing centralized resource management mechanism. On the other hand, the external resource management process uses artificial intelligence to analyze big data to further realize a dynamic adjustment mechanism of resource thresholds, so as to adjust allocation ratios of the sharable resources and the non-sharable resources.

For efficiency and resource usage, the resource management system and the resource management method provided by the present disclosure have a distributed internal resource management process and a pipeline synchronous execution mechanism, such that local requests can immediately use local resources, which further avoid delays that may occur in a non-network transmission environment and a centralized decision-making mechanism.

Furthermore, the dynamic adjustment mechanism of the resource threshold achieved by using artificial intelligence to analyze big data can achieve load balance and resource usage optimization for the worker nodes with heavy loading, through virtual application (vApp) migration of program execution position and increasing a proportion of the non-sharable resources.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A resource management system, comprising:
a plurality of worker nodes and a master node communicatively connected to one another, wherein each of the worker nodes and the master node includes:
a resource pool configured to divide a corresponding system resource into a sharable resource and a non-sharable resource;
a resource monitor configured to record usage status of the resource pool and generate resource usage monitoring data;
a collector agent module configured to transmit the generated resource usage monitoring data;
a traffic steering inference module configured to receive the resource usage monitoring data, and calculate weight ratios of the non-sharable resource and the sharable resource based on the resource usage monitoring data to generate an admission control policy;
a request processing module configured to receive a plurality of resource usage requests from a plurality of electronic devices;
an admission controller configured to allocate the plurality of resource usage requests to the non-sharable resource and the sharable resource according to the admission control policy; and a threshold adjuster configured to adjust an allocation ratio of the sharable resource and the non-sharable resource;

wherein the master node further includes:

a data collector configured to receive the resource usage monitoring data of the plurality of worker nodes and the master node from the collector agent modules of the plurality of worker nodes and the master node, to generate resource usage statistics data;

an artificial intelligence (AI) computing module configured to input the resource usage statistics data into a trained AI model to generate a plurality of records of threshold data for allocating the resource pools of the plurality of worker nodes and the master node, respectively, wherein each of the plurality of records of threshold data defines the allocation ratio in each of the resource pools, and the traffic steering inference modules of the plurality of worker nodes and the master node are configured to respectively control, based on the plurality of records of threshold data, the corresponding threshold adjusters to adjust the sharable resources and the non-sharable resources of the resource pools; and a load balancer configured to balance the plurality of resource usage requests that are allocated to the sharable resource in each of the plurality of worker nodes and the master node to all of the sharable resources of the plurality of worker nodes and the master node.

2. The resource management system according to claim 1, wherein the traffic steering inference module is further configured to calculate loads of the non-sharable resource and the sharable resource based on the resource usage monitoring data to generate the admission control policy, and a summation of the weight ratios of the non-sharable resource and the sharable resource of each of the resource pools is 1.

3. The resource management system according to claim 2, wherein the admission control policy includes:

in response to the load of the non-sharable resource being less than a heavy loading threshold, allocating the plurality of resource usage requests to the non-sharable resource;

in response to the load of the non-sharable resource being greater than or equal to the heavy loading threshold, and a random value related to the plurality of resource usage requests is less than or equal to the weight ratio of the non-sharable resource, allocating the plurality of resource usage requests to the non-sharable resource; and in response to the load of the non-sharable resource being greater than or equal to the heavy loading threshold and the random value related to the resource usage requests is greater than the weight ratio of the non-sharable resource, allocating the plurality of resource usage requests to the sharable resource.

4. The resource management system according to claim 1, wherein the admission control policy includes:

in response to a number of the plurality of resource usage requests being greater than a current available resource amount of the resource pool, the resource usage requests are rejected, and the non-sharable resources of each resource pool can only be used by the usage resource requests of the electronic devices at local ends of the plurality of worker nodes and the master node.

5. The resource management system according to claim 1, wherein the trained AI model is generated by training an AI model with historical resource usage statistics data.

6. The resource management system according to claim 5, wherein the AI model is a neural network model, which includes an input layer, an output layer and a plurality of hidden layers, and the input layer, the output layer and the hidden layers each includes a plurality of neurons.

7. The resource management system according to claim 5, wherein the historical resource usage statistics data include user required resource, remaining resources of the non-sharable resources, remaining resources of the sharable resources, time information, and resource usage status at a specific time.

8. The resource management system according to claim 1, wherein the system resources include processing capacity of a central processing unit (CPU), memory usable capacity, network usable capacity, flash memory usable capacity, hard disk usable capacity and processing capacity of a graphic processor.

9. A resource management method applicable to a plurality of worker nodes and a master node in communication with each other, each of the plurality of worker nodes and the master node including a resource pool, a resource monitor, a collector agent module, a traffic steering inference module, a request processing module, an admission controller, and a threshold adjuster, the master node further including a data collector, an artificial intelligence (AI) computing module, and a load balancer, and the resource management method comprising:

performing an internal resource management process for each of the plurality of worker nodes and the master node, wherein the internal resource management process includes:

configuring the resource pool to divide a corresponding system resource into a sharable resource and a non-sharable resource;

configuring the resource monitor to record usage status of the resource pool and generate resource usage monitoring data;

configuring the collector agent module to transmit the generated resource usage monitoring data to the traffic steering inference module;

configuring the traffic steering inference module to receive the resource usage monitoring data, and calculate weight ratios of the non-sharable resource and the sharable resource based on the resource usage monitoring data to generate an admission control policy;

configuring the request processing module to receive a plurality of resource usage requests from a plurality of electronic devices; and configuring the admission controller to allocate the plurality of resource usage requests to the non-sharable resource and the sharable resource according to the admission control policy, wherein the threshold adjuster is configured to adjust an allocation ratio of the sharable resource and the non-sharable resource; and performing an external resource management process for each of the plurality of worker nodes and the master node, wherein the external resource management process includes:

configuring the data collector to receive the resource usage monitoring data of the plurality of worker nodes and the master node from the collector agent modules of the plurality of worker nodes and the master node, to generate resource usage statistics data;

configuring the AI computing module to input the resource usage statistics data into a trained AI model to generate a plurality of records of threshold data for allocating the resource pools of the plurality of worker nodes and the master node, respectively, wherein each of the plurality of records of threshold data defines the allocation ratio in each of the resource pools;

configuring the traffic steering inference modules of the plurality of worker nodes and the master node to respectively control, based on the plurality of records of threshold data, the corresponding threshold adjusters to adjust the sharable resources and the non-sharable resources of the resource pools; and configuring the load balancer to balance the plurality of resource usage requests that are allocated to the sharable resource in each of the plurality of worker nodes and the master node to all of the sharable resources of the plurality of worker nodes and the master node.

10. The resource management method according to claim 9, further comprising:

configuring the traffic steering inference module to calculate loads of the non-sharable resource and the sharable resource based on the resource usage monitoring data to generate the admission control policy, wherein a summation of the weight ratios of the non-sharable resource and the sharable resource of each of the resource pools is 1.

11. The resource management method according to claim 10, wherein the admission control policy includes:

in response to the load of the non-sharable resource being less than a heavy loading threshold, allocating the plurality of resource usage requests to the non-sharable resource;

in response to the load of the non-sharable resource being greater than or equal to the heavy loading threshold, and a random value related to the plurality of resource usage requests being less than or equal to the weight ratio of the non-sharable resource, allocating the plurality of resource usage requests to the non-sharable resource; and in response to the load of the non-sharable resource being greater than or equal to the heavy loading threshold and the random value related to the resource usage requests being greater than the weight ratio of the non-sharable resource, allocating the plurality of resource usage requests to the sharable resource.

12. The resource management method according to claim 9, wherein the admission control policy includes:

in response to a number of the plurality of resource usage requests being greater than a current available resource amount of the resource pool, rejecting the resource usage requests, wherein the non-sharable resources of each resource pool can only be used by the usage resource requests of the electronic devices at local end of the plurality of worker nodes and the master node.

13. The resource management method according to claim 9, wherein the trained AI model is generated by training an AI model with historical resource usage statistics data.

14. The resource management method according to claim 13, wherein the AI model is a neural network model, which includes an input layer, an output layer and a plurality of hidden layers, and the input layer, the output layer and the hidden layers each includes a plurality of neurons.

15. The resource management method according to claim 13, wherein the historical resource usage statistics data include user required resources, remaining resources of the non-sharable resources, remaining resources of the sharable resources, time information, and resource usage status at a specific time.

16. The resource management method according to claim 11, wherein the system resources include processing capacity of a central processing unit (CPU), memory usable capacity, network usable capacity, flash memory usable capacity, hard disk usable capacity and processing capacity of a graphic processor.

* * * * *